US005323582A

United States Patent [19]

Watson

[11] Patent Number: 5,323,582

[45] Date of Patent: Jun. 28, 1994

[54] CONCRETE REINFORCEMENT BAR SUPPORT MEMBER

[76] Inventor: Paul B, Watson, 20642 NE. 175th, Woodinville, Wash. 98072

[21] Appl. No.: 812,071

[22] Filed: Dec. 19, 1991

[51] Int. Cl.[5] .......................... E04C 5/20; B29C 37/00

[52] U.S. Cl. .......................................... 52/689; 52/677; 52/678; 52/687; 52/741.1; 264/275; 264/277

[58] Field of Search .................. 273/288, 447; 52/677, 52/678, 679, 686, 687, 689, 741.1; 264/275, 277; D21/51

[56] References Cited

U.S. PATENT DOCUMENTS

| | | | |
|---|---|---|---|
| D. 70,800 | 8/1926 | McDonald | 273/447 |
| 3,255,565 | 6/1966 | Menzel | 52/678 |
| 3,387,423 | 6/1968 | Andersen | 52/678 |
| 3,471,987 | 10/1969 | Yelsma . | |
| 3,788,025 | 1/1974 | Holmes . | |
| 3,830,032 | 8/1974 | Robb | 52/687 |
| 4,498,270 | 2/1985 | Ilukowicz . | |
| 4,682,461 | 7/1987 | Sizemore . | |

OTHER PUBLICATIONS

Plastic Concrete Rebar Accessories, Product Guide and Price List, Dura-Tech, Dayton, Ohio.

General Information, FOSROC-PRECO Product Catalog.

*Primary Examiner*—Michael Safavi

*Attorney, Agent, or Firm*—Hughes, Multer & Schacht

[57] ABSTRACT

An apparatus for supporting concrete reinforcement bar within a form. The apparatus comprises a plurality of legs so formed that, when the apparatus is placed in any random orientation on a surface of the form, the ends of at least three legs contact the surface of the form and at least two legs extend upwardly to receive the reinforcement bar. Preferably, any given leg is adjacent to four legs and is non-adjacent to one leg, where the angle between the given leg and any adjacent leg is 90° and the angle between the given leg and any non-adjacent leg is 180°.

4 Claims, 4 Drawing Sheets

CONCRETE REINFORCEMENT BAR SUPPORT MEMBER

TECHNICAL FIELD

The present invention relates to members that support reinforcement bars within concrete structures and, more particularly, to such members designed to ensure that such reinforcement bars are completely surrounded by concrete when the concrete structure is formed.

BACKGROUND OF THE INVENTION

Steel bars, referred to as reinforcement bars, are often provided in concrete structures to provide greater structural strength to these structures. The present invention relates to a method and apparatus for supporting such reinforcement bars. The present invention is generally applicable to any concrete structure containing reinforcement bars; however, the present invention is particularly useful when used to support reinforcement bars used in preformed concrete structures and that application will be discussed in detail herein. The scope of the invention should nonetheless be determined by the attached claims and not the following detailed description.

In preformed concrete structures, such as highway dividers and wall panels, reinforcement bars are first placed within a form for creating the finished concrete structure. The concrete is then poured into the form and allowed to harden so that the resulting solidified concrete structure takes the general shape of the interior of the form. The solidified structure may then be removed from the form and used as desired.

Ideally, the concrete in its liquid state completely surrounds the reinforcement bars within the form; however, if the reinforcement bars are touching the bottom of the form, they will not be completely surrounded by concrete. The resulting solidified concrete structure thus has reinforcement bar that is exposed to the environment. The exposed reinforcement bar may rust, and the rust may eat into the reinforcement bar within the solidified structure, eventually destroying the structural integrity of the solidified concrete structure.

The above-described problem can be alleviated by supporting the reinforcement bar within the mold while the liquid concrete is poured therein. Such support prevents the reinforcement bar from contacting the bottom of the mold and thereby ensures that the concrete will completely surround the bar. The reinforcement bar in the solidified concrete structure will thus not be exposed to the environment and will not be susceptible to rust.

PRIOR ART

Numerous devices have been proposed for supporting reinforcement bar within a form to ensure that the concrete in its liquid state completely surrounds the reinforcement bar. Generally, these devices are plastic pieces or devices having feet or a base portion for contacting the ground and a clip or cradle portion for supporting the reinforcement bar. Such devices are disclosed, for example, in: (a) U.S. Pat. Nos. 3,471,987 issued 14 Oct. 1969 to Yelsma, 3,788,025 issued 29 Jan. 1974 to Holmes, 4,498,270 issued 12 Feb. 1985 to Ilukowicz, and 4,682,461 issued 28 Jul. 1987 to Sizemore; (b) Plastic Concrete Rebar Accessories, Product Guide and Price List, DURA-TECH, Dayton, Ohio (PLASCLIPS and MESHCLIPS); and (c) General Information, FOSROC-PRECO product catalog (BARSPAN CLIP, PRECO CLIPS, STACK-HI-CHAIRS, and ECONOCHAIRS).

All of the devices disclosed above that space the reinforcement bar from a bottom surface of the form are designed to be placed into the form in a particular orientation. For example, the Yelsma patent discloses a number of supporting devices each comprising a pair of legs which support a saddle formed by a pair of arms. To use the Yelsma devices effectively, these devices must be carefully placed on the bottom surface of the form with the legs thereof contacting the surface and the arms thereof extending upwardly. The act of placing these devices on the bottom surface of the mold in their correct orientation is time-consuming and laborious for the worker.

Additionally, once the devices disclosed above are placed on top of the bottom surface of the form, they tend to be top heavy and may be kicked or bumped over so that they must be replaced into their proper orientation.

Another drawback with the above-listed devices is that they do not support sufficient loads. For example, the BARSPAN CLIP device identified above was tested by the Applicant to support approximately 80 lbs of force before it failed structurally. During the process of aligning the reinforcement bar within the form, the workers may step on the reinforcement bar. The combined weight of the reinforcement bar and the worker may crush the supporting device, requiring its replacement.

A further drawback of these devices is that they are relatively complicated in shape and thus expensive to manufacture. The Sizemore device, for example, comprises two separate pieces that must be assembled to form the entire supporting device.

FIG. 10 depicts another prior art method of supporting reinforcement bar within the form. This device basically comprise two metal wires 2 and 4 bent and welded together at a point 6. The wires 2 and 4 are bent to form feet 8, and these feet 8 are coated with a rubber or other non-oxidizing material. The reinforcement bar is laid on top of the wire 2 and affixed thereto with a wire wrap. Devices such as that depicted in FIG. 10 are relatively unstable, require an extra step of wire wrapping the reinforcement bar, and, if the rubber should tear, could allow rust to penetrate the finished concrete structure along the wires 2 or 4 to the reinforcement bar.

OBJECTS OF THE INVENTION

From the foregoing it should be apparent that a primary object of the present invention is to provide improved apparatus and methods for supporting reinforcement bar within a form for concrete products.

Another important, but more specific, object of the present invention is to provide methods and apparatus for supporting reinforcement bar that provides a favorable mix of the following factors:

a. spacing the reinforcement bar a fixed distance from a bottom surface of the form;
b. resisting structural failure under the loads expected on the reinforcement bar during the process of aligning the reinforcement bar within the form;
c. allowing the supporting device to be easily placed into the form;

d. allowing the supporting device to be placed into the form in arbitrary orientations;

e. providing stable support of the reinforcement bar;

f. preventing rust from penetrating through the support member itself to reach the reinforcement bar; and g. allowing the supporting device to be easily and cheaply manufactured.

Additional objects and advantages of the present invention will become apparent from the following description and accompanying drawings.

SUMMARY OF THE INVENTION

There have been invented, and disclosed herein, certain new and novel support members for supporting concrete reinforcement bar within a form.

In the present invention, the support member comprises a plurality of legs so formed that, when the apparatus is placed in any random orientation on a surface of the form, the ends of at least three legs contact the surface of the form and at least two legs extend upwardly to receive the reinforcement bar. Preferably, each of these legs is cruciform in cross-section.

In a first embodiment, any given leg is adjacent to four legs and is non-adjacent to one leg, where the angle between the given leg and any adjacent leg is substantially 90° and the angle between the given leg and any non-adjacent leg is 180°.

The present invention may also be embodied in a method of supporting concrete reinforcement bar within a form. This method preferably comprises the steps of: (a) providing a plurality of support members each having a plurality of legs so formed that the support members may be placed in any random orientation on a surface of the form with the ends of at least three legs contacting the surface of the form and with at least two legs extending upwardly; (b) placing the plurality of support members within the form; and (c) placing the reinforcement bar in the form between the upwardly extending legs of the support members.

DETAILED DESCRIPTION OF THE PREFERRED EMBODIMENTS

First Embodiment

Figure 1:
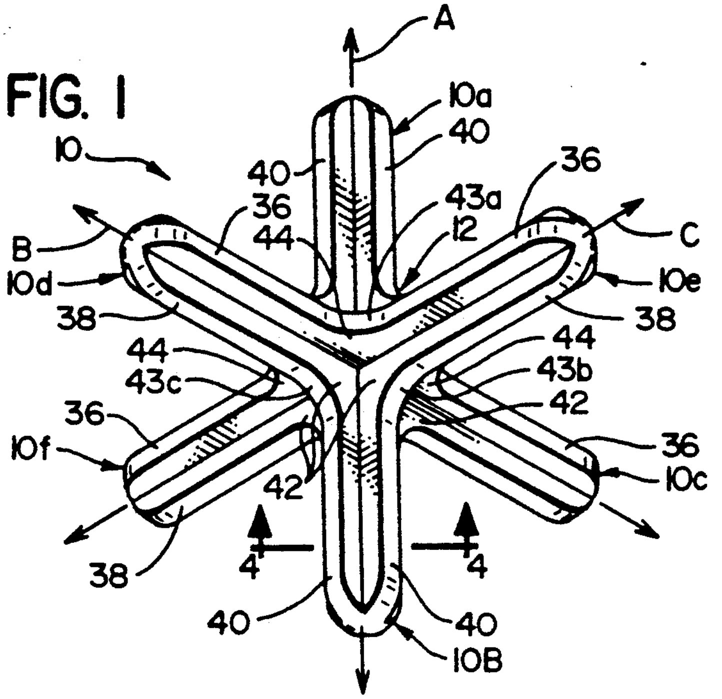
FIG. 1 is a perspective view depicting a first embodiment of the present invention.

Referring now to the drawing, depicted in FIG. 1 is a support member 10 constructed in accordance with, and embodying, the principles of a first embodiment of the present invention. The support member 10 is preferably formed from injection molded plastic and comprises a center portion 12 and six leg portions **10*a–f*.**

Figure 2:
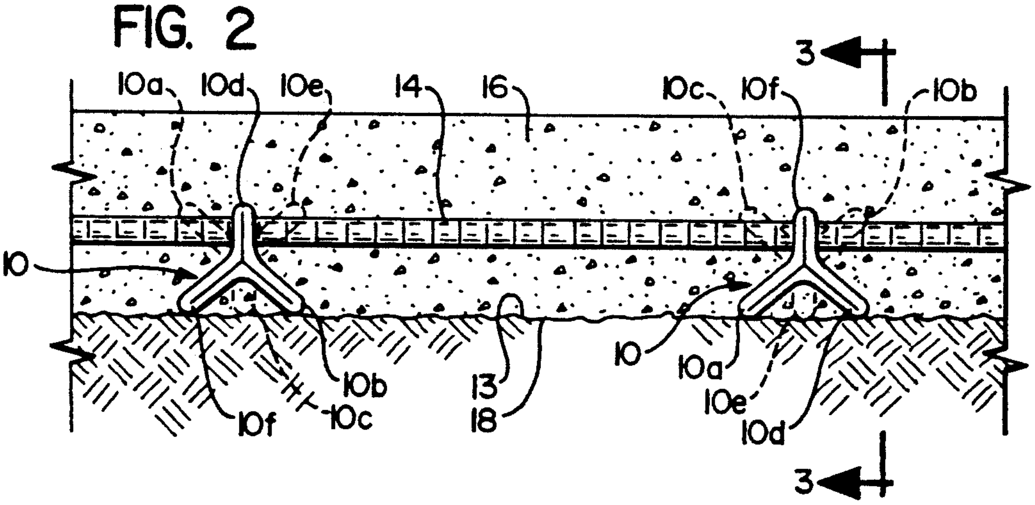
FIG. 2 is a side, partial cut-away view of the present invention in place within a preformed concrete structure.
Figure 3:
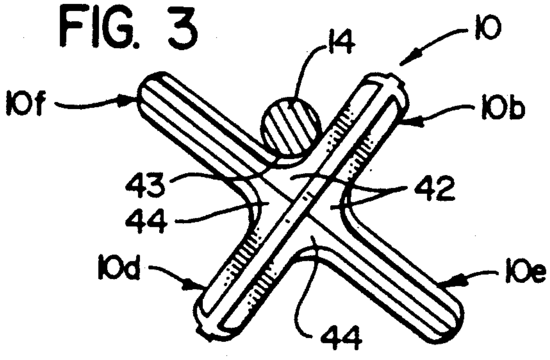
FIG. 3 is a side view of the present invention taken along the lines 3 in FIG. 2.

FIG. 2 depicts a pair of such support members 10 in contact with a steel concrete reinforcement bar 14 and rigidly suspended within a solid, monolithic preformed concrete structure 16. In FIG. 2, the concrete structure 16 is cut-away to show the support members 10, but it should be understood that a substantial portion of these members 10, as well as the entire bar 14, is normally hidden from view within the structure 16.

The support members 10 are integrally formed from a single piece of plastic material. The leg portions **10*a–f* are joined at the center portion 12 and extend outwardly therefrom. As will be described in more detail below, the reinforcement bar 14 is cradled by a first set of legs 10*a*, 10*c*, and 10*e*, while a second set of legs 10*b*, 10*d*, and 10*f* extend to a surface 18 of the solidified concrete structure 16. This surface 18 abuts the surface 13 in FIG. 2**.

In this first embodiment, the legs **10*a–f* of each support member 10 are of equal length and are substantially symmetrically arranged about the center portion 12. More particularly, the legs 10*a* and 10*b* are arranged in a first plane extending through an axis A, the legs 10*c,d,e,f* are arranged in a second plane defined by axes B and C. These axes A, B, and C extend through a point at the center of the center portion 12** and, in this first embodiment are orthogonal to each other. In other words, in the first embodiment, the angle between a first leg and any adjacent leg, where adjacent legs are defined as any leg not aligned along the same axis as the first leg, is 90°, and the angle between any leg and a leg aligned along the same axis (a non-adjacent leg) is 180°.

The use of the support members 10 will now be described with reference to FIGS. 7–9. A form or mold for the preformed concrete structure 16, in this case a wall structure, is depicted at reference character 20. This form 20 is generally rectangular in shape and comprises a bottom 22 and side walls 24, 26, 28, and 30.

Figure 8:
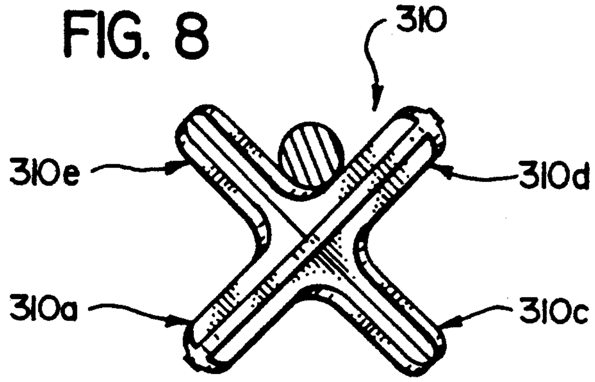
FIG. 8 is a side view of a fourth embodiment of the present invention taken along the reinforcement bar supported thereby.

As shown in FIG. 8, a plurality of support members 10 are dropped onto the upper surface 13 of the form bottom 22. These support members 10 may be dropped or placed on a surface 13 in any arbitrary orientation; no matter how these support members 10 are dropped, the support members 10 so rest on the surface 13 that a first set of three legs of each member 10 project downwardly to contact the bottom surface 13 of the form 20 and a second set of three legs of each member 10 project upwardly.

A first set of reinforcement bars such as the bar 14 may then be placed into the form 20 such that they are parallel with each other and the sides 24 and 28 and are cradled within the upwardly projecting legs of the support members 10. The support members 10 are spaced at distances along the length of the bars 14. The distances between the support members 10 are determined by the rigidity of the bars 14: as a general rule, the less rigid the bar, the closer together the support members must be placed to prevent the bar from sagging and contacting the bottom surface 13.

A second set of reinforcement bars 32 are placed across the bars 14 to form a grid of reinforcement bars which provides structural strength to the concrete member 16. At the points were the bars 32 cross the bars 14, a wire wrap 34 is formed to maintain the reinforcement bars 14 and 32 in the desired grid arrangement during the subsequent process of forming the concrete structure 16.

Concrete in liquid form is then poured into the form 20. If the support members are properly placed along the lengths of the bars 14, the liquid concrete completely surrounds the bars 14 and 32; that is, the support members 10 position or space the bars 14 and 32 away from the bottom surface 13 of the form 20 in a manner that allows the liquid concrete to flow under or around these bars 14 and 32. The concrete is then allowed to solidify into the final concrete structure 16 and may be removed from the form 20.

The cement in liquid form will not cover the entire tips of the second set of downwardly extending legs of each support member 10 because these tips are in contact with the surface 13; accordingly, the tips of this second set of legs will likely be exposed to the environment. However, this will not pose a problem because the support members 10 are plastic and are thus not susceptible to rust.

Furthermore, the appearance of the surface 18 of the structure 16 will not be impaired because only a very small surface area of the legs of the members 10 are visible. To minimize any adverse effects on appearance by these visible portions of the support members 10, the plastic from which these members 10 are made may be formulated to approximate the color of the cement and/or aggregate contained in the concrete.

The support members 10 of the first embodiment will now be described in further detail with reference to FIGS. 1–4. In the first embodiment, the distance between the center portion 12 and the ends of the legs distal therefrom are the same for each of the legs 10*a,b,c,d,e,f*. In this first embodiment, the distance from the tip of one leg to the tip of a non-adjacent leg is approximately 8 cm.

Each of the legs 10*c,d,e,f* of the members 10 comprises a main portion 36 and a flange portion 38. These legs 10*c,d,e,f* are cruciform in cross-section, and the main portions 36 may be formed slightly thicker than the flange portions 38. The flange portions 38 provide rigidity to the main portions 36. In the first embodiment, the main portions 36 are approximately 5/32" thick and 13/32" wide, and the flange portions 38 are approximately ⅛" thick and 13/32" wide.

Figure 4:
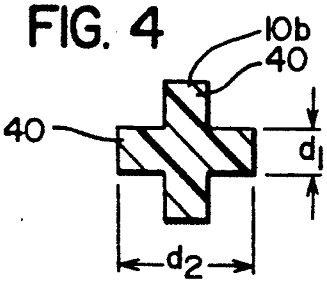
FIG. 4 is a cross-sectional view of one leg of the present invention taken along lines 4 in FIG. 1.
Figure 5A:
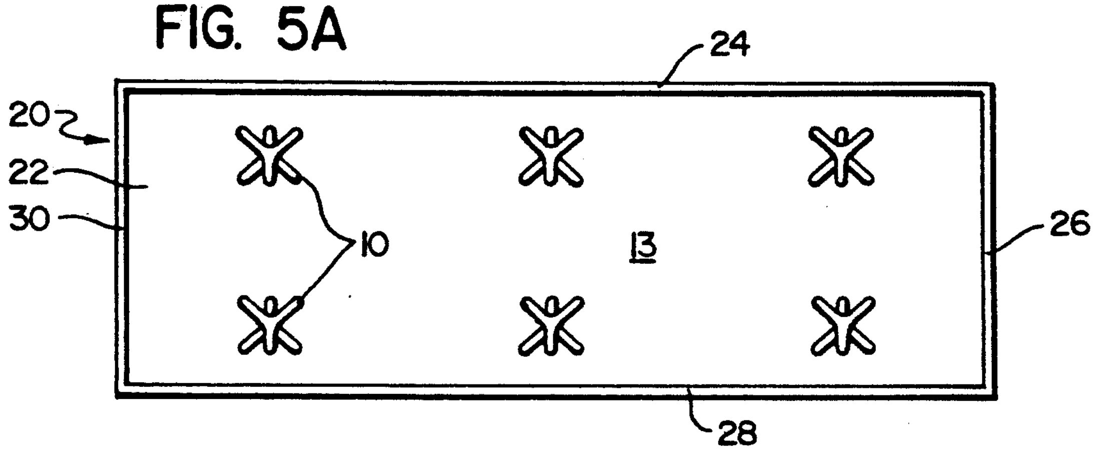
FIGS. 5A–5C are schematic views depicting the method of using the present invention.
Figure 5B:
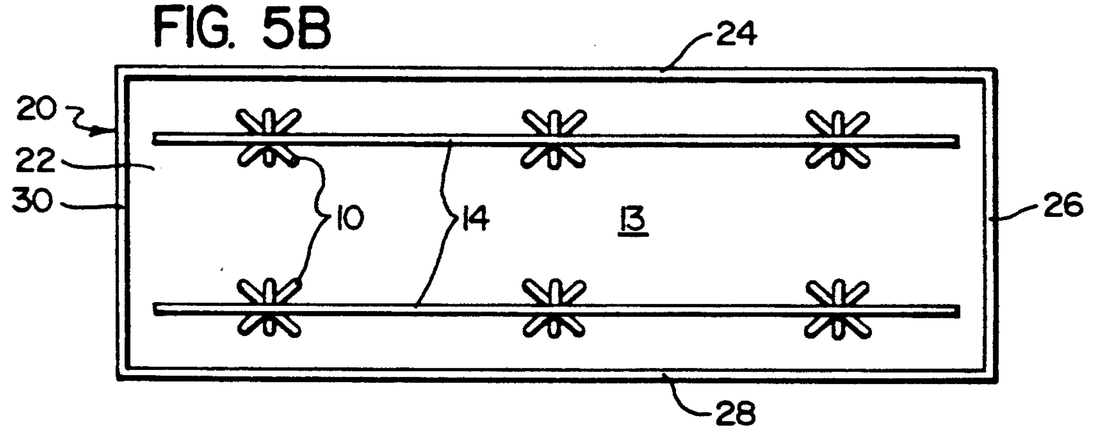
Figure 5C:
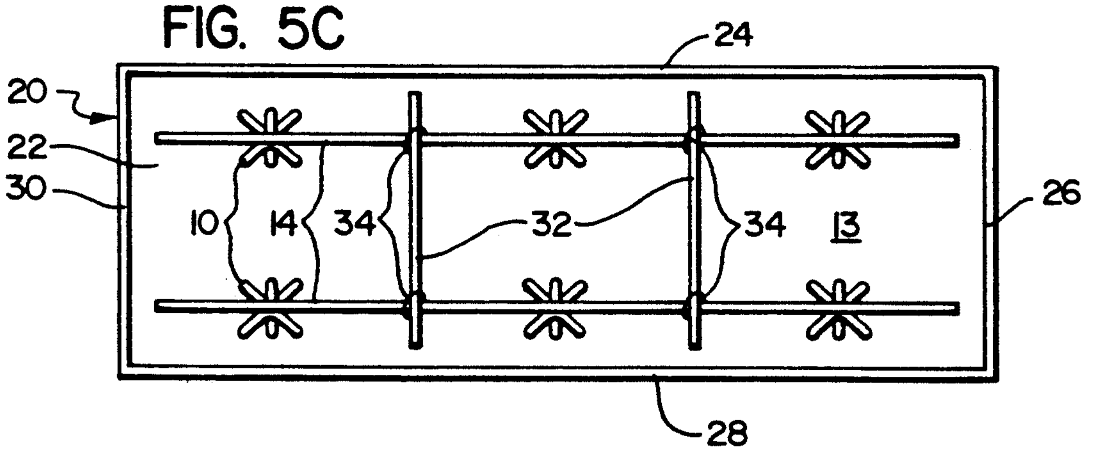

As shown in FIG. 4, the legs 10*a,b* maintain the same basic cruciform cross-section as the legs 10*c,d,e,f* but are formed from two web portions 40. These web portions 40 narrow slightly towards the ends of the legs 10*a,b* that are distal from the center portion 12. In the preferred, the thickness $d_1$ these web portions 40 is approximately ⅛" near the center portion 12. This thickness $d_1$ linearly decreases in size to a thickness of approximately 3/32" at the distal ends of these legs 10*a,b*. Additionally, the width $d_2$ of these web portions 40 decreases from approximately 7/16" near the center portion 12 to approximately ⅜" near the leg distal ends.

The flange portions 38 and the web portions 40 are joined near the center portion 12 by center web structures 42. Similarly, the main portions 36 of adjacent legs are joined near the center portion 12 by main web structures 44. The center and main web structures 40 and 42 comprise cradle portions 43 having surfaces that are inwardly curved towards the center portion 12. These cradle portions 43, one of which is clearly shown in FIG. 3, support the reinforcement bar 14. In this first embodiment, two such cradle portions 43 maintain the reinforcement bar 14 a distance of 1/12" above the bottom surface 13 of the form 20.

Additionally, the radii of curvature of the cradle portions 43 may be varied depending upon the radius of the reinforcement bar 14. For reinforcement bars of larger radius, the radii of curvature of the cradle portions 43 should be increased. In the preferred embodiment, the radii of curvature of these cradle portions 43 are equal and are approximately 7/16".

It should be clear that any three adjacent legs will form at least a trio of cradle portions such as the cradle portions 43*a,b,c* depicted in FIG. 1; however, the reinforcement bar will rest only on two of the the cradle portions formed by any three adjacent legs that extend upwardly when the support member 10 is placed in a form such as form 20.

The support member 10 as just described in detail can be manufactured cheaply and quickly. The arrangement by which all of the legs 10*a,b,c,d,e,f* are at right angles to each other, while not essential to practice the invention in its broadest form, greatly simplifies the mold necessary for making the support member 10.

Furthermore, the parting line where two halves of a mold for producing the support member 10 will come together may be formed parallel to the second plane defined by the lines A and B in FIG. 1. The benefits of this arrangement are threefold. First, since the main portions 36 and main web structures 44 are formed along a planar parting line, the portions 36 and structures 44 may be made as thick as necessary to provide strength to the legs 10*c,d,e,f*.

Second, as briefly discussed above, the web portions 40 which form the legs 10*a,b* may be made as thick ($d_1$) and wide ($d_2$) as necessary at the center web structures 42 as long as these dimensions slightly and gradually decreases along the length of these legs 10*a,b* in the direction of the distal ends thereof (away from the center portion 12 and the parting line). Since these legs 10*a,b* extend into the mold during the molding process, this gradual decrease in thickness provides the draft necessary to allow the support member 10 to be ejected from its mold.

Third, an ejector pin or pins may easily be inserted into the mold against the support member 10 to facilitate the removal of the member 10 therefrom.

Not only is the support member 10 as described above easy to manufacture, it should provide more than sufficient strength to support the reinforcement bar and any incidental loads thereon. The support member 10 is normally formed of a high strength engineering thermoplastic such as, for example, a polycarbonate ABS blend. The Applicant has found that a support member 10 manufactured as described above from a polycarbonate ABS blend of recycled material can support approximately 240 lbs before failing. Furthermore, the support member does not fail catastrophically; usually the reinforcement bar 14 supported by a failed support member 10 will still be spaced from the surface 13 of the form 20 when the member 10 fails.

Second Embodiment

Figure 6:
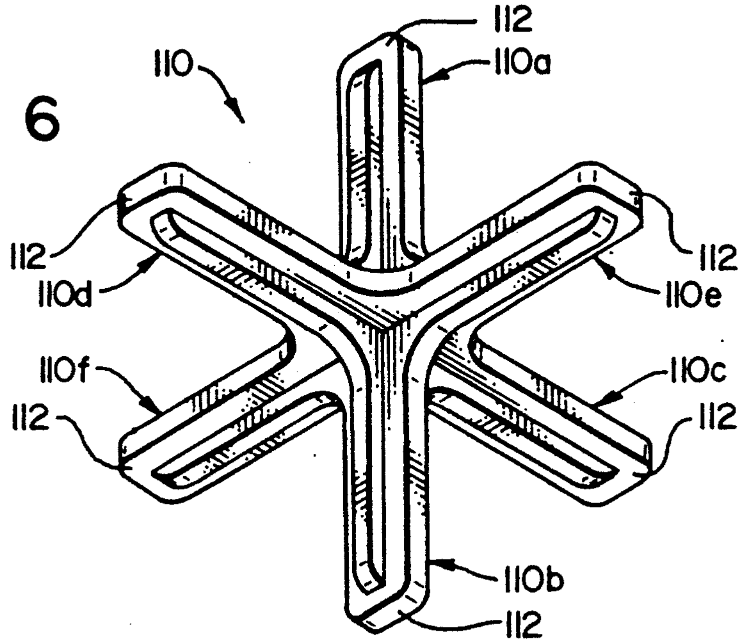
FIG. 6 is a perspective view of a second embodiment of the present invention.

Depicted at 110 in FIG. 6 is a second embodiment of a support member constructed in accordance with the principles of the present invention. The support member 110 is constructed and used in the same basic manner as the support member 10 and will be discussed primarily to the extent that it differs therefrom.

This support member 110 comprises tabs 112 formed on the ends of each of the legs 110*a,b,c,d,e,f*. These tabs 112 minimize the surface area of the member 110 which will be in contact with the surface of the form and thus which will be exposed when the final cement product is formed.

Third Embodiment

Figure 7:
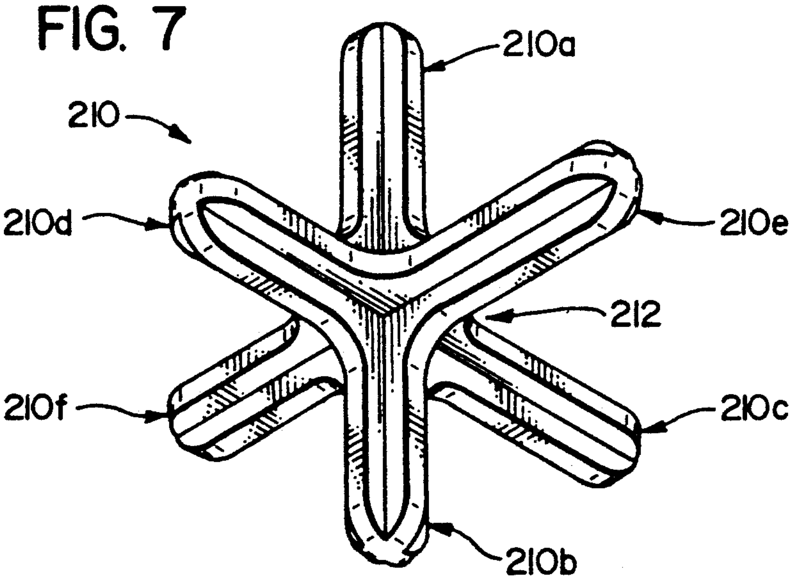
FIG. 7 is a perspective view of a third embodiment of the present invention.

A third embodiment of a support member 210 constructed in accordance with the present invention is depicted in FIG. 7. This member 210 is also constructed and used in the same basic manner as the support member 10 and will be discussed below primarily to the extent its construction and use differ therefrom.

The distance from the center portion 212 of the support member 21 to the tips of a first group of legs 210*b,d,f* thereof is shorter than the distance from the center portion 212 to the tips of a second group of legs 210*a,c,e*. This configuration allows the support member 210 to space a reinforcement bar at any one of three heights from the surface of a form.

Specifically, by placing the three legs 210*a,c,e* in the second group of legs on the form surface, the bar is spaced a first distance from the form surface. By placing any combination of two legs from the first group and one leg from the second group on the surface, the bar is spaced a second distance from the form surface. Finally, by placing the three legs 210*b,d,f* from the first group on the surface, the bar is spaced a third distance from the surface. In this case, the first distance is greater than the second distance and the second distance is greater than the third distance.

Fourth Embodiment

A fourth embodiment of a support member 310 constructed in accordance with the present invention is depicted in FIG. 8. This member 310 is also constructed and used in the same basic manner as the support member 10 and will be discussed below primarily to the extent its construction and use differ therefrom.

The support member 310 comprises two-non adjacent legs that are shorter than the other four legs. Preferably, these two shorter legs are the legs 310*a,b* (only one shown in FIG. 8) which extend into the mold during the process of manufacturing the support member 310.

Regardless of the orientation in which the support member 310 is placed on the surface of the form, one of these shorter legs 310*a,b* contacts this surface. The shorter leg in contact with the surface causes member 310 to lean slightly, thereby, as shown by a comparison of FIGS. 8 and 3, more centrally aligning the load supported by the support member 10 between the ends of the feet in contact with the surface. This provides more stable support for the reinforcement bar 14.

Fifth Embodiment

Figure 9:
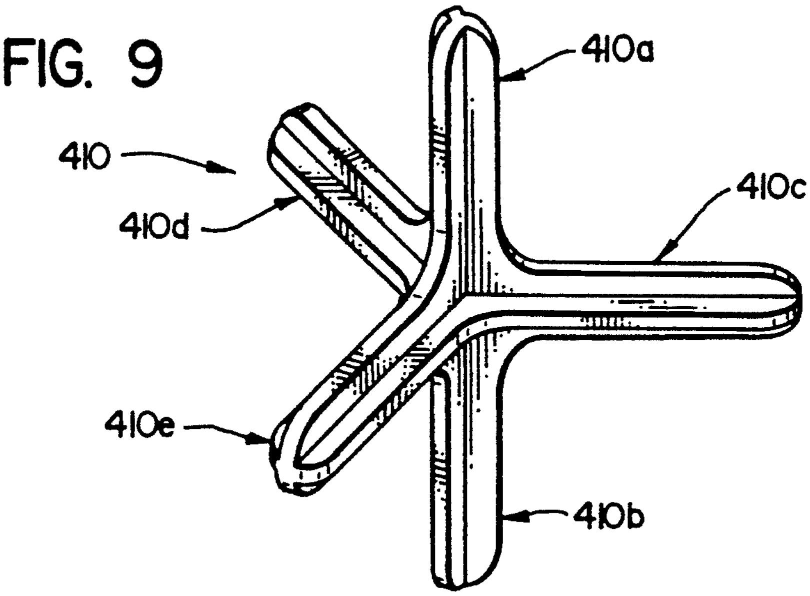
FIG. 9 is a perspective view of a fifth embodiment of the present invention.
Figure 10:
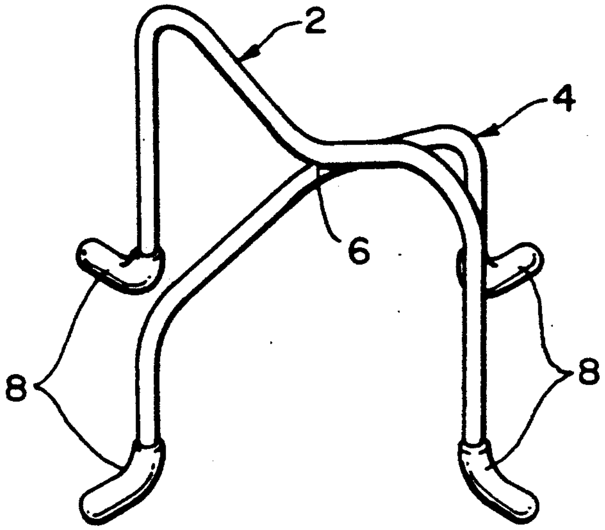
FIG. 10 PRIOR ART
FIG. 10 is a perspective view of a prior art concrete reinforcement bar supporting device.

A support member of a fifth embodiment, indicated at 410, is depicted in FIG. 9 and will also be discussed below primarily to the extent that its construction and differ from that of the support member 10.

This support member 410 comprises only five legs 410*a,b,c,d,e*. Two of these legs, legs 410*a,b*, are non-adjacent as that term is defined above. The other three of these legs, legs 410*c,d,e*, are aligned in a single plane. An angle of 120° lies between any given leg 410*c,d,e* and any other of these legs 410*c,d,e*, while an angle of 90° lies between each of these legs 410*c,d,e* and the legs 410*a,b*. As in the above-described support member 310, the legs 410*a,b* are shorter than the legs 410*c,d,e* to provide additional stability to the member 410.

The support member 410 requires less plastic in its manufacture than the the other members 10, 110, 210, and 310, but may be slightly less stable during use than these other members.

From the foregoing, it should be clear that the present invention may be embodied in forms other than those disclosed above without departing from the spirit or essential characteristics of the present invention. The above-described embodiment is therefore to be considered in all respects illustrative and not restrictive, the scope of the invention being indicated by the appended claims rather than the foregoing description. All changes that come within the meaning and scope of the claims are intended to be embraced therein.

I claim:

1. An apparatus for supporting concrete reinforcement bar within a form, the apparatus comprising a plurality of legs so formed that, when the apparatus is placed in any random orientation on a surface of the form, the ends of at least three legs contact the surface of the form and at least two legs extend upwardly to receive the reinforcement bar, where each leg is cruciform in cross-section.

2. A method of supporting concrete reinforcement bar within a form, the method comprising the steps of:
   a. providing a plurality of support members each having a center portion and a plurality of legs having a first end portion attached to the center portion and a second end portion distal from the center portion, where the legs so extend radially outwardly from the center portion that the support members may be placed in any random orientation on a surface of the form with the second end portions of at least three legs contacting the surface of the form and with at least two legs extending generally upwardly;
   b. placing the plurality of support members within the form; and
   c. placing the reinforcement bar in the form between the upwardly extending legs of the support members.

3. An apparatus for supporting concrete reinforcement bar within a form comprising a center portion and a plurality of legs, in which:
   a. a first group of at least three of the legs extends outwardly from the center portion in a first plane;
   b. a second group of at least two of the legs extends outwardly from the center portion in a second plane, the second plane being non-parallel to the first plane; and
   c. when the apparatus is placed in the form, at least two of the legs in the first group and one of the legs in the second group contact a surface of the form and at least one leg from each group combine to form a saddle portion for supporting the reinforcement bar; wherein the legs in the second group are shorter than the legs in the first group.

4. An apparatus for supporting concrete reinforcement bar within a form comprising a center portion and a plurality of legs, in which:

a. a first group of at least three of the legs extends outwardly from the center portion in a first plane;

b. a second group of at least two of the legs extends outwardly from the center portion in a second plane, the second plane being nonparallel to the first plane; and c. when the apparatus is placed in the form, at least two of the legs in the first group and one of the legs in the second group contact a surface of the form and at least one leg from each group combine to form a saddle portion for supporting the reinforcement bar; wherein the legs in the first group are separated by an angle of 120° and the legs in the second group are separated by an angle of 180°.

* * * * *